United States Patent Office 3,610,119
Patented Oct. 5, 1971

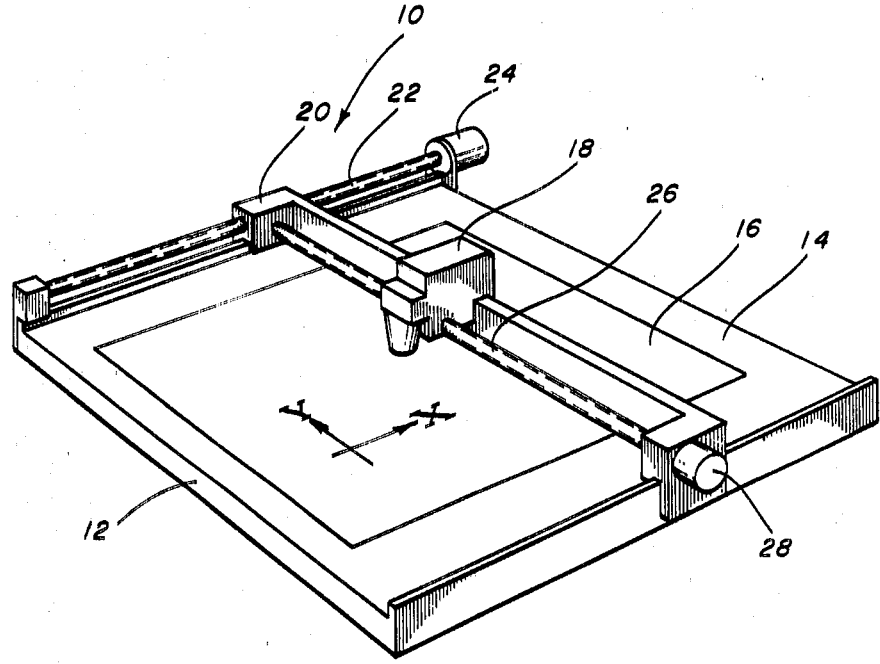
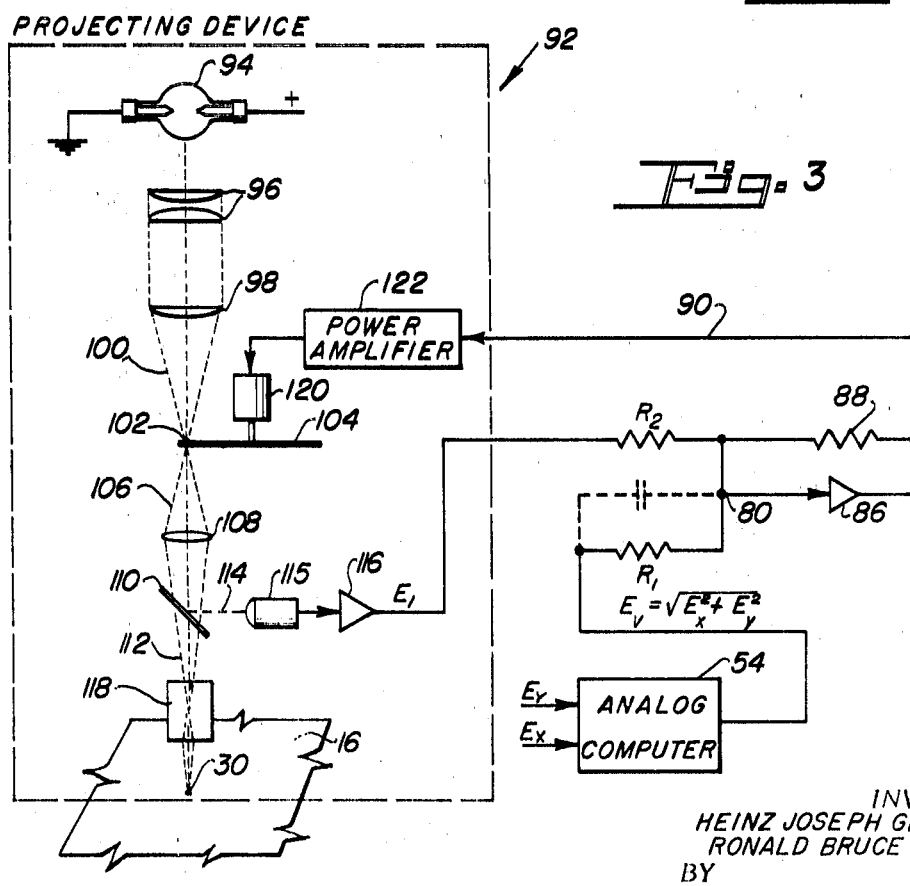

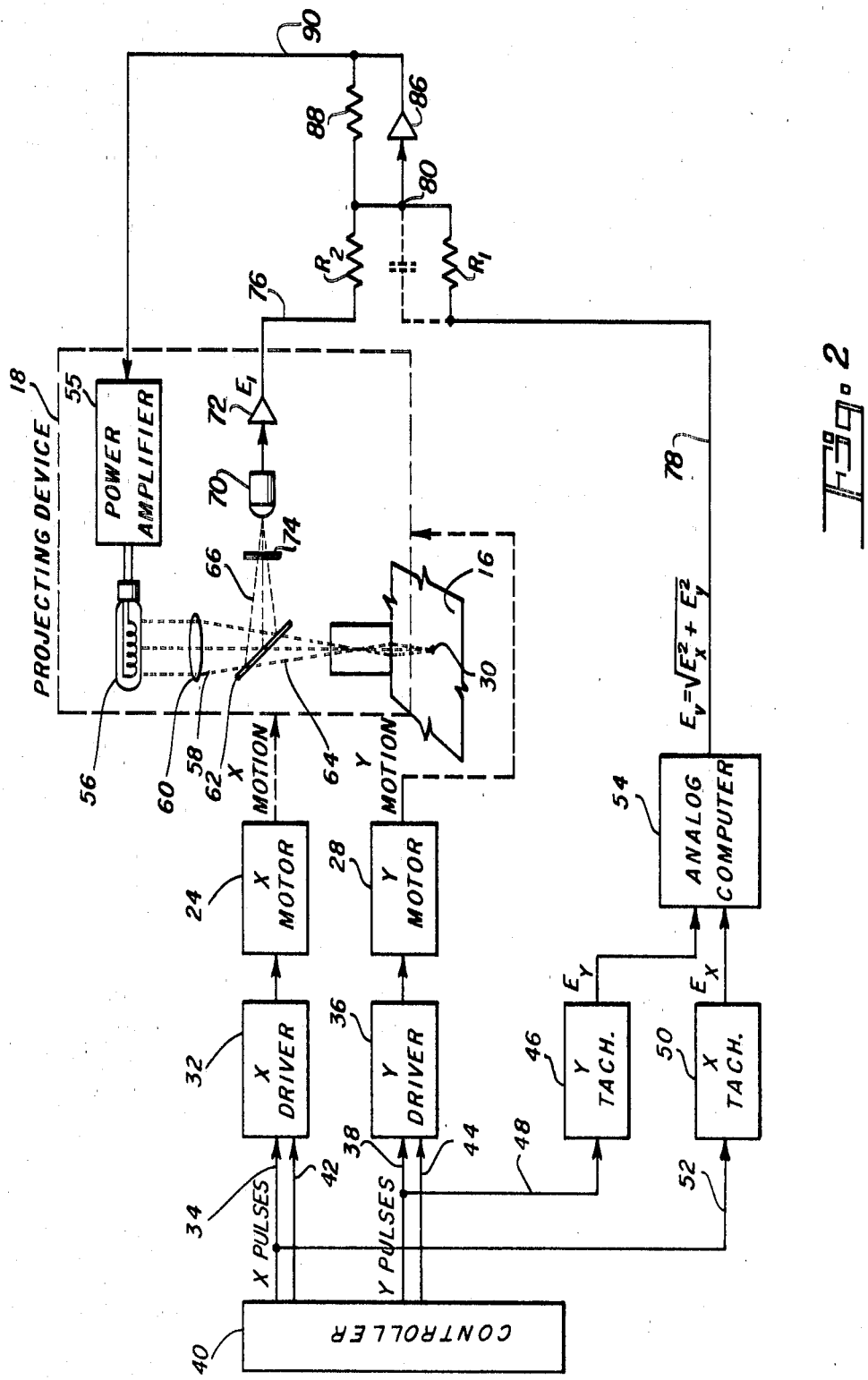

3,610,119
PHOTOEXPOSURE DEVICE
Heinz Joseph Gerber and Ronald B. Webster, West Hartford, Conn., assignors to The Gerber Scientific Instrument Company, South Windsor, Conn.
Filed Apr. 25, 1969, Ser. No. 819,146
Int. Cl. G03b 27/00
U.S. Cl. 95—1                                    13 Claims

ABSTRACT OF THE DISCLOSURE

A device for exposing lines on a sheet of photosensitive material consists of a projector which projects a moving spot of light onto the material. Correct exposure, despite variations in the speed of the spot, is maintained by producing two signals related, respectively, to the velocity of the spot and its intensity and by combining these two signals to produce an error signal used to control the spot intensity. The intensity control consists of a means for regulating the power supplied to an incandescent lamp used as the light source or of a variable density filter positioned in the path of the light beam forming the light spot. The filter is one having a linear transmittance gradient so as to obtain good performance of the closed servo loop by maintaining a substantially constant loop gain at all the positions of the filter. Two stepping motors are provided for driving the projector in two coordinate directions relative to the photosensitive material to obtain movement of the light spot, and the velocity signal used in the servo loop for controlling the spot intensity is derived from the input pulses to these motors.

BACKGROUND OF THE INVENTION

This invention relates to devices for exposing lines on a sheet of photosensitive material, and deals more particularly with such devices wherein a spot of light is moved over such material to expose a line much in the same manner as a line is created by moving a pencil or pen over a sheet of paper.

The device of this invention is or may be generally similar to the photoexposure device described and shown in Pat. No. 3,330,182, assigned to the same assignee as this application. As described in said patent, it is necessary when exposing lines by a moving light spot to vary the intensity of the light spot in accordance with its speed over the photosensitive material in order to produce an acceptable exposure of the line being created. In the device of the patent the intensity of the projected light spot is controlled by an open loop system so that the intensity varies with the speed of the light spot.

This open loop system does not, however, compensate for changes in the intensity of the light spot due to changes in the intensity of the light source or other factors and also does not permit ready adaptation of the device to use with different photosensitive materials having different spectral response characteristics.

The general object of this invention is, therefore, to provide a photoexposure device which is or may be generally similar to that of the aforementioned patent but which is an improvement thereon insofar as having an improved system for controlling the intensity of the projected light spot to maintain a substantially constant exposure at all points along the line being exposed despite changes in spot velocity, lamp intensity, and other factors, and to permit ready adaptation of the device to photosensitive materials having different spectral responses.

SUMMARY OF THE INVENTION

The invention resides in a photoexposure device for exposing a line on a sheet of photosensitive material and including a projecting device for projecting a spot of light onto the surface of such material. The spot of light is moved relative to the photosensitive material as by supporting the material on a flat table and moving the projecting device in two coordinate directions relative to the material. A signal related to the speed of the light spot over the photosensitive surface is produecd as by combining two coordinate speed related signals in an analog computing circuit to produce a resultant velocity signal. A signal related to the intensity of the light spot is obtained by utilizing a beam splitter positioned in the fundamental beam from the light source of the projector and dividing such beam into a main beam projected toward the photosensitive surface to form the light spot and a secondary beam which is sensed by a photodetector to produce the intensity related signal. The intensity related signal and the resultant velocity related signal are compared and produce an error signal which is used to vary the intensity of the projected beam in such a manner as to reduce the error toward zero, thereby producing a closed loop servo system for the intensity control. Matching of the system to the spectral response of the pohtosensitive material may be obtained by a filter interposed in the secondary beam in advance of the photodetector and operable to pass substantially only those frequencies of light to which the photosensitive material is responsive, and which filter may be changed readily and replaced by other filters to adapt the system to the particular material being exposed.

BRIEF DESCRIPTION OF THE DRAWINGS

FIG. 1 is a perspective view of a photoexposure device embodying this invention.

FIG. 2 is a schematic diagram of the photoexposure device of FIG. 1.

FIG. 3 is a schematic diagram of a portion of a photoexposure device comprising another embodiment of this invention.

DESCRIPTION OF THE PREFERRED EMBODIMENTS

Figure 4:
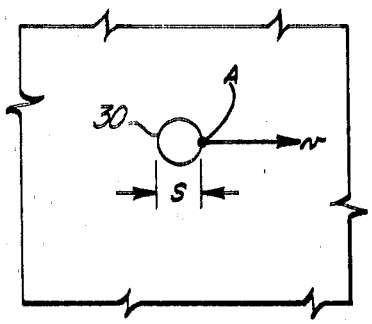
FIG. 4 is a diagram illustrating the movement of a spot of light over the photosensitive material.

FIG. 1 illustrates the general arrangement of a photoexposure device embodying this invention. As shown therein, the device is indicated generally at 10 and includes a table 12 having a flat generally upwardly facing surface 14 for supporting a sheet 16 of photosensitive material. A projecting device 18, sometimes referred to as a light head or exposure head, is located above the supporting surface 14 of the table and operates to project a small beam of light downwardly onto the surface of the photosensitive material 16 to produce a spot of light thereon. The photosensitive sheet 16 may be a photographic film, plate or the like and the light spot projected thereon by the projecting device 16 is moved over the surface thereof to expose a line thereon.

In accordance with the broader aspects of the invention, the movement of the light spot relative to the surface of the sheet 16 may be obtained in many different ways, but in the illustrated case, it is effected by physically moving the projecting device 18 relative to the table 12 and sheet 16, the light spot being fixed relative to the projecting device and moving therewith. For the purpose of so supporting and moving the projecting device 18 the table 12 includes a carriage 20 which spans the supporting surface 14 and which is suitably guided for movement relative to the table in one of two orthogonal coordinate directions relative to the table, such direction being the X direction as indicated by the arrows in FIG. 1. Driving movement of the carriage 20 in the X direction is produced by a lead screw 22 operatively engaged with the carriage and rotated by an associated X stepping motor 24. The projecting device 18 is mounted on the carriage 20 for movement relative thereto in the other orthogonal coordinate direction, or the Y direction of FIG. 1, and is driven in such direction by an associated lead screw 26 which operatively engages the projecting device 18 and is rotated by a Y stepping motor 28.

The table 12 and the associated means for supporting and moving the projecting device 18 relative to the table surface 14 and photosensitive material 16 may take various different forms and may be especially designed for projecting device. However, the table 12 may also conveniently be, and preferably is, that of a conventional existing X-Y plotter wherein the carriage 20 of FIG. 1 is the normal X carriage thereof and the projecting device 18 is an attachment attached to the normal Y carriage of the plotter. That is, the projecting device 18 may consist merely of an attachment replacing the pen, print wheel or other writing or marking implement normally used with the plotter.

Referring to FIG. 2, this figure shows schematically the photoexposure device of FIG. 1, including its control system for moving the light spot relative to the photosensitive material and for maintaining the exposure of the material constant despite variations in the speed of the spot, the light source intensity and other factors. Parts included in the projecting device 18 of FIG. 1 are, in FIG. 2 enclosed within the broken-line box bearing the number 18, and the light spot produced thereby is indicated at 30. As indicated, the projecting device is moved in the X direction by the X stepping motor 24 and in the Y direction by the Y stepping motor 28. The X stepping motor is in turn energized by an X driver 32 which is of conventional construction and operates to sequentially change the energization of the windings of the motor 24 at a rate corresponding to the rate of pulses supplied to the input thereof on the line 34 with the result that the motor 24 is rotated at a speed directly related to the pulse repetition rate of the pulses appearing on the line 34. Similarly, the Y motor 28 is energized by a Y driver 36 which changes the energization of its windings at the rate of the pulses supplied to the input thereof, and appearing on the line 38, so that the motor 28 is rotated at a speed directly related to the pulse repetition rate of the pulses on the line 38. The pulses appearing on the lines 34 and 38 are in turn derived from a suitable associated controller 40 which controls the relative rates and numbers of the pulses on the two lines in accordance with given input instructions to cause the motors 24 and 28 to move the projecting device 18 and cause the spot 30 to follow a desired path. Direction signals, transmitted respectively to the drivers 32 and 36 over lines 42 and 44, control the direction of rotation of the motors 24 and 28. Except when it is desired to move the light spot 30 solely in the X direction or solely in the Y direction, the two motors 24 and 28 are operated simultaneously so that the light spot may be moved in any direction and along any path relative to the photosensitive material 16 by supplying pulses to the drivers 32 and 36 at the proper relative rates.

As part of the system of this invention for maintaining a correct exposure of the photosensitive material as the light spot 30 is moved thereover, a means is provided for producing a signal related to the velocity of the light spot relative to the material. In accordance with the broader aspects of the invention, this signal may be produced in various different ways and may take various different forms, but in the illustrated case of FIG. 2, it is a voltage signal derived from the input pulses to the X and Y drivers 32 and 36. More particularly, the velocity signal producing means includes a Y tachometer circuit 46 connected to the line 38 by a line 48 so that the same pulses supplied to the Y driver are also supplied to it. The circuit 46 in turn is one which is operable to produce an output voltage $E_y$ the value of which is directly related to the pulse repetition rate of the pulses on the line 38. Since the pulse repetition rate of the pulses on the line 38 is directly related to the component velocity of the light spot in the Y direction, the voltage $E_y$ is accordingly also directly related to such component velocity. Similarly, an X tachometer circuit 50 is connected to the line 34 by another line 52 so that the pulses supplied to the X driver 32 are also supplied to the X tachometer circuit 50. The circuit 50 operates to produce a voltage signal $E_x$ having a value directly related to the pulse repetition rate of the pulses appearing on the line 34 so that the voltage signal $E_x$ is accordingly directly related to the speed of the light spot 30 in the X coordinate direction. The two component velocity signals $E_y$ and $E_x$ are used as inputs to an analog computer circuit 54 which produces an output voltage $E_v$ related to the two input voltages by the equation $E_v = \sqrt{E_x^2 + E_y^2}$. $E_v$ is accordingly a voltage signal directly related to the resultant of the signals $E_y$ and $E_x$ and is accordingly directly related to the resultant or true velocity of the light spot 30 relative to the photosensitive material.

The exposure control system also utilizes a signal related to the intensity of the light spot 30 striking the photosensitive material 16. Again, this signal may take various different forms, so long as it is compatible with the velocity signal, and may be produced in various different ways. In the illustrated case of FIG. 2, however, the projecting device 18 utilizes a light source in the form of an incandescent lamp 56 the power to which is controlled by a power amplifier 58. Light rays from the lamp 56 are formed into a fundamental beam 58 which is directed toward the photosensitive material 16 to form the light spot 30. This beam forming means may take various different forms well known in the art and for convenience is shown in FIG. 2 to consist merely of a lens 60. Positioned in the path of the fundamental beam 58 is a beam splitting device which divides the fundamental beam into a main beam directed toward the photosensitive material to form the spot 30 and a secondary beam, the intensity of which is measured to produce the intensity related signal. Various different beam splitting devices may be employed for this purpose, but in the illustrated case, this device is shown to consist of a half-silvered mirror 62 positioned in the path of the fundamental beam 58 with its axis tilted relative thereto. The main beam which passes through the mirror 62 and on to the photosensitive material 16 to form the spot 30 is indicated at 64, and the secondary beam which consists of light rays reflected from the mirror 62 is shown at 66.

Between the mirror 62 and the photosensitive material 16 the projecting device 18 also includes a further optical system indicated at 68 for masking, interrupting, filtering, focusing or for otherwise modifying or controlling the light rays of the main beam 64 to vary various characteristics of the light spot 30 appearing on the photosensitive sheet 16. The mechanism and function of the optical system 68 by itself forms no part of this invention and may vary widely. As an example, this system may include various different apertures for varying the size and/or shape of the spot 30, a zoom lens for controlling the size of the spot, a spectral band-pass filter for eliminating infrared or other undesired portions of the light spectrum, and a shutter for interrupting the beam to turn the light spot on and off. The opical system 68 may also include a set of apertures which are used to form the spot 30 into different shapes for use when the projecting device is held stationary and used in a "flash" mode to expose various symbols or the like on the photosensitive material 16.

The photodetector for detecting the intensity of the secondary beam 66 is indicated at 70, in FIG. 2, and may comprise a photocell, photodiode or other photosensitive sensor. As shown, the photodetector 70 is arranged to intercept the secondary beam 66 at approximately its focal point and produces an output which is amplified by an associated amplifier 72 to produce a voltage signal $E_1$ which is directly related to the intensity of the secondary beam and accordingly directly related to the intensity of the fundamental beam 58, the main beam 64 and the light spot 30. A band-pass filter 74 is positioned in front of the photodetector 70 and is selected so that the frequencies of light passed thereby are substantially the same as those to which the photosensitive material 16 is responsive. That is, various different photosensitive materials are responsive or sensitive to different frequencies of light and by using a filter 74 of proper chromatic transmittance the output signal $E_1$ may be made to be one which is related only to the intensity of those frequencies to which the material responds. Therefore, by having a number of different filters of different spectral characteristics any selected one, or group thereof, may be used as the filter 74 to adapt the photoexposure device to the material being exposed and the substitution of filters to achieve proper matching is one which is simple and may readily be made.

The voltage signal $E_1$ which is, as mentioned, related to the intensity of the spot 30 and which is hereinafter referred to as the spot intensity signal appears on the line 76 and the velocity signal $E_v$ appears on the line 78. These two signals are compared by connecting the lines 76 and 78 to a common point 80 through two resistors $R_1$ and $R_2$, and one of the signals is negative while the other is positive, the signal $E_v$ being indicated to be the negative one in FIG. 2. The voltage, if any, appearing at the common point 80 is an error signal which is supplied to an operational amplifier 86 including a feed-back resistor 88. The output of the amplifier 86 in turn appears on the line 90 and controls the power amplifier 58 to control the amount of power supplied to the incandescent lamp 56. The operation is such that if the signal appearing at the common point 80 is positive, indicating that the spot intensity is too large for its speed, the output of the amplifier 86 appearing on the line 90 is of such sign as to command the power amplifier 58 to decrease the power supplied to the lamp 56, thereby decreasing the intensity of the fundamental beam 58, the secondary beam 66, the spot intensity and the output signal $E_1$, and accordingly reducing the error voltage at the point 80 toward 0. The system accordingly is a closed loop servo system which operates to maintain the error signal at the point 80 at a zero value.

The system as described above operates to maintain a substantially constant exposure of the material swept by the light spot 30 despite variations in the speed of the light spot or other factors. This may be shown by first considering FIG. 4 which shows the light spot 30 in enlarged form. Assume, as shown, that the diameter of the spot is $s$ and that its velocity is $v$. Consider a small point A on the sheet of photosensitive material which is swept by the full diameter of the spot 30. The time required for the spot to traverse this point A is $t=s/v$. Exposure of this point is then $$P=\frac{s}{v}K$$

where K is the intensity of the spot 30 and where P is measured in meter-candle seconds. To obtain a good exposure of the material 16 it is necessary that the exposure P remain substantially constant. Therefore, in the equation $$P=\frac{s}{v}K$$

it is necessary, to maintain P constant, that the quantity $K/v$ remain constant. In the described system the voltage signal $E_1$ is directly related to K and the voltage $E_v$ is directly related to $v$ so that if the ratio $E_1/E_v$ is maintained constant the quantity $K/v$ is also maintained constant, as desired. Since the system of FIG. 2 operates to maintain the error signal at the common point 80 at a zero value the voltages $E_1$ and $E_v$ are related by the equation $E_1R_1=E_vR_2$, and from this it is seen that $E_1/E_v=R_2/R_1$, which is a constant as desired.

Turning to FIG. 3 this figure shows schematically a portion of another photoexposure device comprising another embodiment of this invention. The device of FIG. 3 differs from that of FIGS. 1 and 2 in the construction of the projecting device, which in FIG. 3 is indicated generally at 92, and in all other aspects may be similar to that shown in FIGS. 1 and 2. That is, the FIG. 3 device includes a table for supporting the photosensitive material 16 and a driving and support means for the projecting device 92 similar to the corresponding parts of FIGS. 1 and 2, and also includes an analog computer 54 for producing the velocity signal $E_v$ in the same manner as the one in the FIGS. 1 and 2 device. Likewise, the operational amplifier 86 and the resistors $R_1$ and $R_2$ and 88 are the same as the correspondent components of FIGS. 1 and 2.

The projecting device 92 of FIG. 3 differs from that of FIGS. 1 and 2 in that it uses arc lamp 94 as the light source and a variable density filter as the means for controlling the intensity of the fundamental beam used to form the light spot 30. Associated with the arc lamp 94 are two condenser lenses 96, 96 and another lens 98 which forms rays of light from the arc lamp 96 into a beam 100 which is focused to form a real image of the arc of the lamp at a given point 102. All of the rays of the beam 100 are, therefore, concentrated into a small area at the point 102 and the variable density filter, indicated at 104, is arranged to intercept the beam at approximately this point. The variable density filter 104 is one which has a light transmittance which varies gradually in one direction relative to the main surface of the filter, and therefore by intercepting the beam 100 at the point 102 the transmittance gradient of the filter has little or no effect on the intensity of the emergent beam as measured across its cross section. That is, the beam which emerges from the filter 104 is of substantially uniform intensity throughout its cross sectional area despite the transmittance gradient of the filter. This emergent beam is indicated at 106 and comprises what is referred to herein as the fundamental beam used to form the light spot 30, it being generally equivalent to the fundamental beam 58 of FIG. 2.

The fundamental beam 106 which is of a divergent nature as it emerges from the filter 104 is formed in a convergent beam by a lens 108 and after passing the lens 108 is split by a beam splitting mirror 110, similar to the mirror 62 of FIG. 2, into a main beam 112 which passes through the mirror to form the spot 30 and a secondary beam 114 which is sensed by a photodetector 115 to form the intensity signal $E_1$ which appears at the output of the amplifier 116 connected with the photodetector 115. The main beam 112 passes through an optical system 118 which is or may be similar to that indicated at 68 in FIG. 2 and which, as mentioned in FIG. 2, may include various different components to modify the shape, size and other characteristics of the spot 30.

Figure 5:
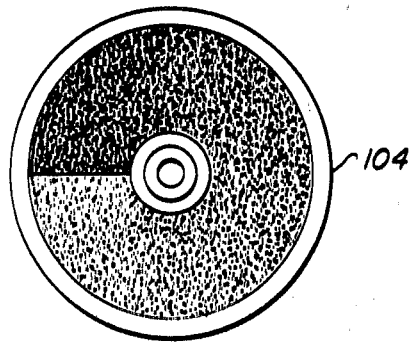
FIG. 5 is a plan view of the filter disc used in the device of FIG. 3.

The variable density filter 104 may take various forms, but as shown best in FIG. 5 it preferably consists of a filter disc having a light transmittance which varies in the angular direction relative to its main face. That is, at different points about the axis of the disc it has different light transmittances so that by rotating the disc about its axis portions of different light transmittance may be brought into registration with the beam 100 to vary the intensity of the emergent or fundamental beam 106, thereby varying the intensity of the light spot 30. The disc 104, as shown in FIG. 3, is positioned by a servo motor 120 in turn controlled by a power amplifier 122 operating in response to the output signal of the operational amplifier 86 appearing on the line 90.

Considering the operation of the FIG. 3 device, when a positive voltage signal appears at the common point 80, indicating a spot intensity too high for its speed, an output signal appears on the line 90 which operates the power amplifier 22 to energize the servo motor 120 to rotate the filter disc 104 in the direction to bring a more dense portion of the filter disc into registration with the beam 100 thereby reducing the intensity of the fundamental beam 106 and the beam spot 30, as desired, and simultaneously reducing the intensity signal $E_1$ so as to tend to reduce the error signal at the common point 80. Likewise, when a negative signal appears at the common point 80, indicating a spot intensity too low for its speed, the reverse procedure takes place to cause the filter disc 104 to be rotated to bring a less dense portion thereof into registration with the beam 100 thereby increasing the intensity of the fundamental beam 106 and the beam spot 30 and simultaneously increasing the value of the voltage signal $E_1$ to again return the error signal 80 toward 0.

Figure 6:
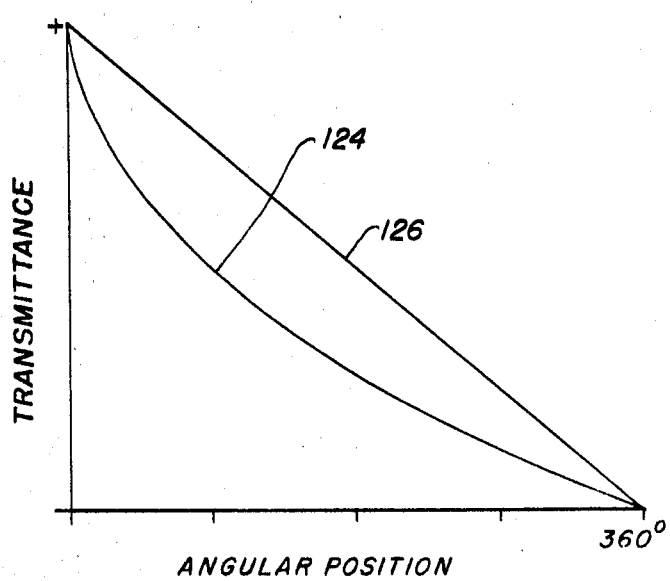
FIG. 6 is a graph illustrating the linear character of the light transmissibility or density gradient of the filter disc of FIG. 5 as compared to that of previously avaliable discs.

Before leaving the device shown in FIG. 3, it should be noted that in the past, and for other applications, it has been common to manufacture variable density filter discs so as to have a transmittance gradient which is of a substantially logarithmic character as indicated by the line 124 on the graph of FIG. 6 which shows the transmittance of the disc at various different angular positions measured about its center axis. This type of filter disc, however, when used in the system of FIG. 3, has been found to be undesirable in that it tends to produce instability and/or poor performance of the closed loop servo system. More particularly, this type of filter introduces different degrees of loop gain into the loop at different positions of the disc. The extreme left-hand portion of the curve 124 provides a relatively high gain whereas the extreme right-hand portion produces a relatively low gain. If the closed loop system is designed to operate satisfactorily at one of these gains it will most usually not operate satisfactorily and become unstable at the other of these gains. Therefore, the filter disc 104 used in the device of FIG. 3 is preferably one which has a relatively linear transmittance gradient as indicated by the line 126 of FIG. 6. With such a linear gradient filter disc, the gain of the disc is a constant at all angular positions thereof so that varying its angular position does not change the gain of the closed loop system, and accordingly does not introduce any stability problems.

We claim:

1. A photoexposure device for exposing a line on a sheet of photosensitive material, said device comprising means for supporting a sheet of photosensitive material, a projecting device for projecting a spot of light onto the surface of said sheet of said photosensitive material, first means for controllably moving said spot of light in a first one of two coordinate directions relative to said sheet of photosensitive material, second means for controllably moving said spot of light in the second of said coordinate directions relative to said sheet of photosensitive material, means for producing a first signal related to the rate at which said spot of light is moved in said first coordinate direction by said first means, means for producing a second signal related to the rate at which said spot of light is moved in said second coordinate direction by said second means, means for combining said first and second rate signals to produce a signal related to the resultant rate of movement of said light spot relative to said sheet of photosensitive material, means for producing a signal related to the intensity of said light spot, means for comparing said resultant rate signal with said light spot intensity signal and for producing an error signal when the ratio of said latter two signals are not equal to a predetermined constant, and means for varying the intensity of said light spot in response to said error signal and in such a manner as to reduce said error signal.

2. A photoexposure device as defined in claim 1 further characterized by said means for supporting a sheet of photosensitive material comprising means providing a supporting surface for receiving and supporting said sheet, said means for controllably moving said spot of light in said first coordinate direction relative to said sheet of photosensitive material comprising means for moving said projecting device and said supporting surface relative to one another in said one coordinate direction, and said second means for controllably moving said spot of light in said second coordinate direction relative to said sheet of photosensitive material comprising means for moving said projecting device and said supporting surface relative to one another in said second coordinate direction.

3. A photoexposure device as defined in claim 1 further characterized by said first means for controllably moving said spot of light in said first coordinate direction relative to said sheet of photosensitive material including a stepping motor the stepping rate of which is directly related to the rate of movement of said spot of light in said one coordinate direction relative to said sheet of photosensitive material, and said second means for controllably moving said spot of light in said second coordinate direction relative to said sheet of photosensitive material including a second stepping motor the stepping rate of which is directly related to the rate of movement of said spot of light in said second coordinate direction relative to said sheet of photosensitive material, means for supplying input driving pulses to each of said first and second stepping motors, said means for producing a first signal related to the rate at which said spot of light is moved in said first coordinate direction and said means for producing a second signal related to the rate at which said spot of light is moved in said second coordinate direction each comprising a means connected with the input of the associated one of said stepping motors and responsive to the pulses supplied thereto for producing an output voltage signal the value of which is directly related to the repetition rate of the pulses supplied to said associated stepping motor, and said means for combining said first and second rate signals comprising an analog device utilizing said signals to produce an output voltage signal at least approximately proportional to the resultant light beam velocity.

4. A photoexposure device as defined in claim 1 further characterized by said projecting device including a light source and means for forming rays of light from said light source into a beam which is projected toward said photosensitive surface to form said light spot, and said means for producing a signal related to the intensity of said light spot comprising a beam splitting device positioned in the path of said beam for splitting it into a main beam at least a portion of which passes on to said photosensitive surface to form said spot and a secondary beam, and a photodetector arranged to intercept said secondary beam and produce an output signal related to the intensity thereof.

5. A photoexposure device as defined in claim 4 further characterized by a filter extending across said secondary beam in advance of said photodetector for modifying the output signal produced by said photodetector.

6. A photoexposure device as defined in claim 5 further characterized by said filter having such a transmittance characteristic as to pass substantially only those frequencies of light to which said sheet of photosensitive material is responsive.

7. A photoexposure device as defined in claim 4 further characterized by said beam splitting device comprising a partially silvered mirror extending across said fundamental beam at angle to the axis thereof and functioning to transmit a portion of said fundamental beam to form said main beam and to reflect another portion of said fundamental beam to form said secondary beam.

8. A photoexposure device as defined in claim 1 further characterized by said projecting device including a light source and means for forming rays of light from said light source into a beam at least a portion of which is directed toward said photosensitive material to form said light spot, and said means for varying the intensity of said light spot in response to said error signal including a variable light transmittance filter means through which said beam is transmitted to vary the intensity thereof, and means for controlling said filter means to vary the transmittance thereof relative to said light beam in response to said error signal, said variable transmittance filter means comprising a filter element having a principal face extending generally transversely of said beam and through which element said beam is transmitted, said filter element having a light transmittance which varies gradually and in a linear fashion in one direction along said principal face, and said means for controlling said filter means comprising means for moving said filter element in said one direction relative to said light beam in response to said error signal to bring portions thereof of different light transmittance into registry with said beam.

9. A photoexposure device for exposing a line on a sheet of photosensitive material, said device comprising means for supporting a sheet of photosensitive material, a projecting device including a light source and means for forming rays of light from said light source into a beam directed toward said photosensitive material to form a spot of light on the surface of said photosensitive material, means for moving said spot of light relative to said photosensitive material to cause it to expose a line thereon, means for producing a signal related to the velocity of said spot of light relative to said light sensitive material, means for producing a signal related to the intensity of said light spot, means for comparing said velocity signal with said light spot intensity signal and for producing an error signal when the ratio of said latter two signals are not equal to a predetermined constant, a filter element positioned in the path of said light beam, said filter element having a main face extending generally transversely of said light beam and having a light transmittance which varies in a linear manner in one direction along said main face, and means for moving said filter element in said one direction relative to said light beam in response to said error signal to bring portions thereof of different light transmittance into registry with said beam to vary the intensity of said light spot and reduce said error signal.

10. A photoexposure device as defined in claim 9 further characterized by said filter element being a filter disc the light transmittance of which varies in a linear manner in an angular direction relative to the axis of said disc so that as said disc is rotated about said axis the intensity of the beam emerging from said disc is varied in a linear manner.

11. A photoexposure device for exposing a line on a sheet of photosensitive material, said device comprising means for supporting a sheet of photosensitive material, a projecting device including a light source and means for forming rays of light from said light source into a beam directed toward said photosensitive material to form a spot of light on the surface of said photosensitive material, means for moving said spot of light relative to said photosensitive material to cause it to expose a line thereon, means for producing a signal related to the velocity of said spot of light relative to said light sensitive material, means for producing a signal related to the intensity of said light spot, means for comparing said velocity signal with said light spot intensity signal and for producing an error signal when the ratio of said latter two signals are not equal to a predetermined constant, and means for varying the intensity of said light spot in response to said error signal, said means for producing a signal related to the intensity of said light spot including a beam splitter for splitting said beam into a main beam directed toward said photosensitive surface to form a spot of light on the surface of said photosensitive material and a secondary beam, and a photodetector for detecting the intensity of said secondary beam.

12. A photoexposure device as defined in claim 10 further characterized by a filter means positioned to intercept said secondary beam in advance of said photodetector.

13. A photoexposure device as defined in claim 12 further characterized by said filter means having such a transmittance characteristic as to pass substantially only those frequencies of light to which said sheet of photosensitive material is responsive.

References Cited
UNITED STATES PATENTS

| | | | |
|---|---|---|---|
| 3,085,469 | 4/1963 | Carlson | 355—37 |
| 3,330,182 | 7/1967 | Gerber et al. | 95—1 |
| 3,473,455 | 10/1969 | Schoenthal | 95—12 |

JOHN M. HORAN, Primary Examiner

T. A. MAURO, Assistant Examiner

U.S. Cl. X.R.
95—12; 355—81